United States Patent
Lee et al.

(10) Patent No.: US 10,867,566 B2
(45) Date of Patent: Dec. 15, 2020

(54) METHOD AND SOURCE DRIVING MODULE FOR DRIVING DISPLAY PANEL

(71) Applicant: HIMAX TECHNOLOGIES LIMITED, Tainan (TW)

(72) Inventors: Yi-Chin Lee, Tainan (TW); Hsin-Wei Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/221,629

(22) Filed: Dec. 17, 2018

(65) Prior Publication Data

US 2020/0193923 A1    Jun. 18, 2020

(51) Int. Cl.
  *G09G 3/36*   (2006.01)
  *G02F 1/133*  (2006.01)

(52) U.S. Cl.
  CPC ....... *G09G 3/3614* (2013.01); *G02F 1/13306* (2013.01); *G09G 3/3648* (2013.01); *G02F 2201/123* (2013.01); *G09G 2300/0426* (2013.01); *G09G 2310/08* (2013.01); *G09G 2340/16* (2013.01)

(58) Field of Classification Search
  None
  See application file for complete search history.

(56) References Cited

U.S. PATENT DOCUMENTS

| 10,043,486 | B2 | 8/2018 | Zhang et al. | |
|---|---|---|---|---|
| 2013/0155086 | A1 | 6/2013 | Sartain et al. | |
| 2013/0278585 | A1 | 10/2013 | Moon et al. | |
| 2013/0314451 | A1 | 11/2013 | Kim et al. | |
| 2019/0122623 | A1* | 4/2019 | Lee | G09G 3/3614 |
| 2020/0051516 | A1* | 2/2020 | Kim | G09G 3/3618 |

FOREIGN PATENT DOCUMENTS

| CN | 103714788 A | | 4/2014 | |
|---|---|---|---|---|
| CN | 104134418 A | | 11/2014 | |
| CN | 107799053 A | | 3/2018 | |
| KR | 20200016646 | * | 2/2020 | ........... G09G 3/36 |
| TW | I644305 B | | 12/2018 | |

* cited by examiner

*Primary Examiner* — Ifedayo B Iluyomade
(74) *Attorney, Agent, or Firm* — CKC & Partners Co., LLC

(57) ABSTRACT

A method for driving a display panel having plural pixel electrodes arranged in rows and columns is provided. The method includes: receiving display data in plural periods; converting the received display data into a source voltage signal for each of the pixel electrodes; and applying the respective source voltage signal to each of the pixel electrodes. Each of the periods includes plural frames consisting of plural non-skipped frames and at least one skip frame subsequent to the non-skipped frames. The polarity of the source voltage signal in the non-skipped frame directly preceding the skip frame of one period is opposite to the polarity of the source voltage signal in the non-skipped frame directly preceding the skip frame of subsequent period.

4 Claims, 5 Drawing Sheets

| | frame 0 | frame 1 | frame 2 | frame 3 | frame 4 | frame 5 | frame 6 | frame 7 | frame 8 | frame 9 | frame 10 | frame 11 |
|---|---|---|---|---|---|---|---|---|---|---|---|---|
| 60Hz | + | - | + | - | + | - | + | - | + | - | + | - |
| 40Hz | + | - | X | - | + | X | + | - | X | - | + | X |

| | frame 0 | frame 1 | frame 2 | frame 3 | frame 4 | frame 5 | frame 6 | frame 7 | frame 8 | frame 9 | frame 10 | frame 11 |
|---|---|---|---|---|---|---|---|---|---|---|---|---|
| 60Hz | + | - | + | - | + | - | + | - | + | - | + | - |
| 40Hz | + | - | x | + | - | x | + | - | x | + | - | x |

FIG. 4

METHOD AND SOURCE DRIVING MODULE FOR DRIVING DISPLAY PANEL

BACKGROUND

Field of Invention

The present invention relates to a display panel. More particularly, the present invention relates to a method and a source driving module for driving the display panel.

Description of Related Art

With rapid advance in technology, the liquid crystal display (LCD) has been provided and widely used in various applications. In general, the liquid crystal cells of the LCD cannot be fixed at a particular voltage, otherwise the liquid crystal cells, once the characteristics are damaged, can no longer be rotated in response to the change in electrical field to form different grey levels. Thus, the polarities of the source voltage signals applied to the liquid crystal cells are inverted on alternate display frames in prior art methods for driving LCD displays.

SUMMARY

One aspect of the invention is directed to a method for driving a display panel having plural pixel electrodes arranged in rows and columns. The method includes: receiving display data in plural periods; converting the received display data into a source voltage signal for each of the pixel electrodes; and applying the respective source voltage signal to each of the pixel electrodes. Each of the periods includes plural frames consisting of plural non-skipped frames and at least one skip frame subsequent to the non-skipped frames. The skip frame is the frame without applying the source voltage signal to each of the pixel electrodes. The polarity of the source voltage signal in the non-skipped frame directly preceding the skip frame of one period is opposite to the polarity of the source voltage signal in the non-skipped frame directly preceding the skip frame of subsequent period.

In accordance with one or more embodiments of the invention, polarities of the source voltage signal applied to each of the pixel electrodes in two consecutive non-skipped frames of each of the periods are opposite to each other.

Another aspect of the invention is directed to a source driving module for driving a display panel having plurality pixel electrodes arranged in rows and columns. The source driving module includes a data storage unit, a data converting unit, and a source driver. The data storage unit is configured to receive display data in plural periods. The data converting unit is operatively coupled to the data storage unit and configured to convert the received display data into a source voltage signal for each of the pixel electrodes. The source driver is operatively coupled to the data converting unit and configured to apply the respective source voltage signal to each of the pixel electrodes. Each of the periods includes plural frames consisting of plural non-skipped frames and at least one skip frame subsequent to the non-skipped frames. The skip frame is the frame without applying the source voltage signal to each of the pixel electrodes. The polarity of the source voltage signal in the non-skipped frame directly preceding the skip frame of one period is opposite to the polarity of the source voltage signal in the non-skipped frame directly preceding the skip frame of subsequent period.

In accordance with one or more embodiments of the invention, polarities of the source voltage signal applied to each of the pixel electrodes in two consecutive non-skipped frames of each of the periods are opposite to each other.

BRIEF DESCRIPTION OF THE DRAWINGS

The invention can be more fully understood by reading the following detailed description of the embodiment, with reference made to the accompanying drawings as follows:

FIG. 4 illustrates a scheme showing the polarities of source voltage signals for different driving frequency according to an exemplarily embodiment of the present invention.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

Figure 1:
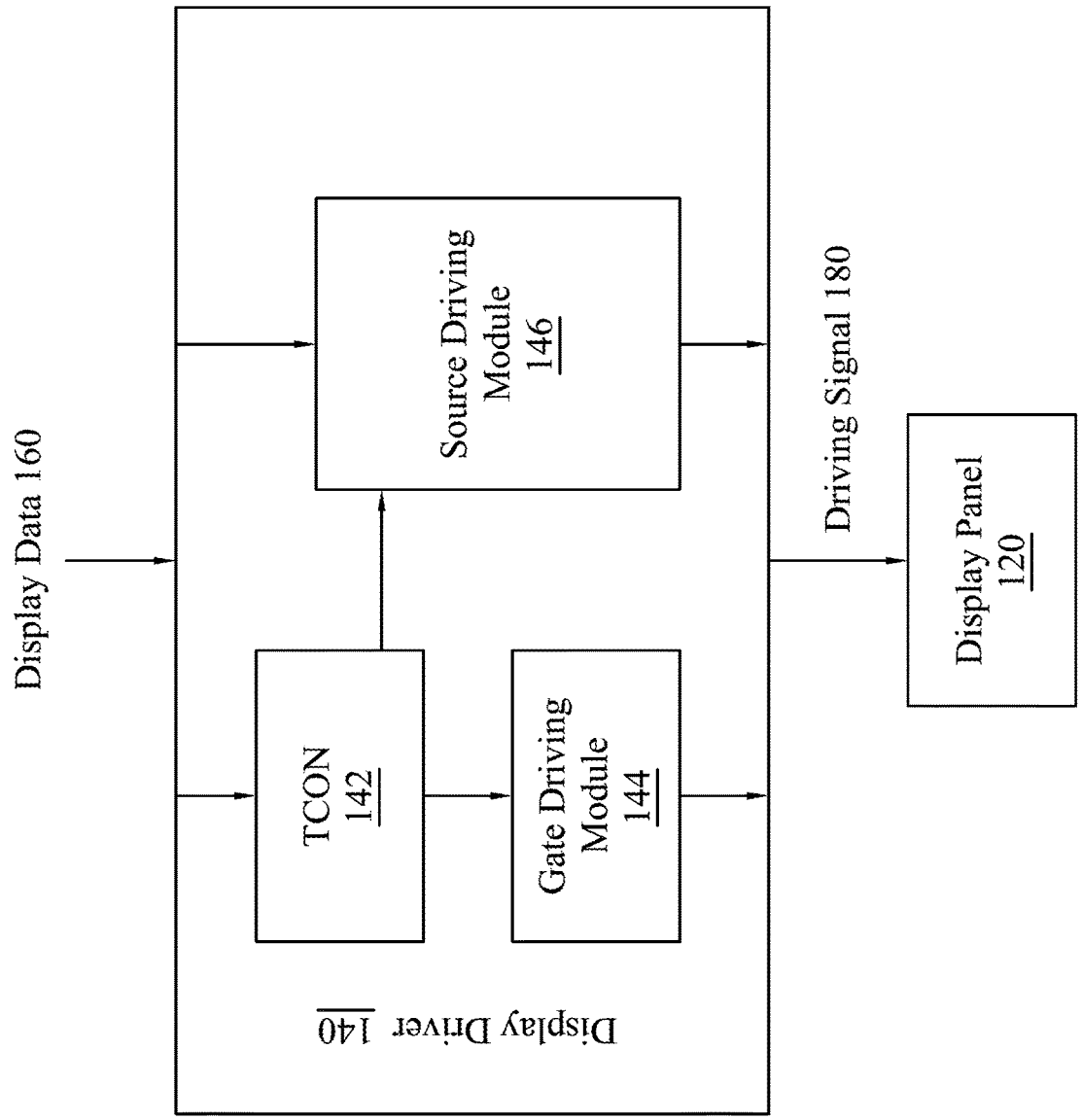
FIG. 1 illustrates a block diagram of a display module according to an embodiment of the present invention.

FIG. 1 illustrates a block diagram of a display module 100 according to an embodiment of the present invention. The display module 100 includes a display panel 120 and a display driver 140 operatively coupled to the display panel 120. The display panel 120 has plural pixel electrodes arranged in multiple rows and columns. The display panel 120 may be any suitable type of display panel, such as a liquid crystal display (LCD) panel or a low temperature ploy-silicon (LTPS) LCD panel.

As shown in FIG. 1, the display driver 140 is configured to receive display data 160 and to provide driving signals 180 based on the received display data 160. The driving signals 180 are used for controlling writing of pixel electrodes and directing operations of the display panel 120. Specifically, the display driver 140 may provide the driving signals 180 with suitable voltage, current, timing, and/or de-multiplexing, to make the display panel 120 show the desired text or the desired image.

As shown in FIG. 1, the display driver 140 includes a timing controller (TCON) 142, a gate driving module 144, and a source driving module 146. In the embodiment of the present invention, the display driver 140 may also include any other suitable components such as, but not limited to, an encoder, a decoder, one or more processors, controllers, and storage devices. The TCON 142 is configured to receive the display data 160 in multiple frames. Based on received display data 160, the TCON 142 provides control signals to the gate driving module 144 and source driving module 146, respectively.

The gate driving module 144 may include a digital-analog converter (DAC) and multiplexers (MUX) for converting the digital control signals to analog gate driving signals and applying the gate driving signals to the scan lines according to the preset scanning sequences. The gate driving signals are applied to the gate electrode of each thin film transistor (TFT) to turn on the corresponding TFT by applying a gate voltage so that the data for the corresponding pixel may be written by the source driving module 146.

The source driving module 146 is configured to write the display data 160 into pixel electrodes based on the control signals from the TCON 142 in multiple frames. The source driving module 146 may include a DAC, MUX, and arithmetic circuit for controlling, based on the control signals, a timing of application of voltage to the source electrode of each TFT and a magnitude of the applied voltage according to gradations of the display data 160. That is, the source driving module 146 may simultaneously apply the source voltage signals to the data lines.

Figure 2:
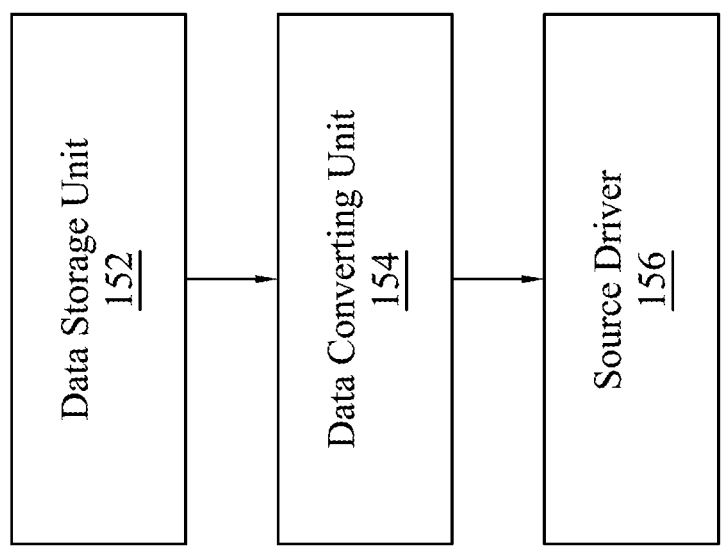
FIG. 2 a block diagram of the source driving module of the display module according to the embodiment of the present invention.
Figure 3:
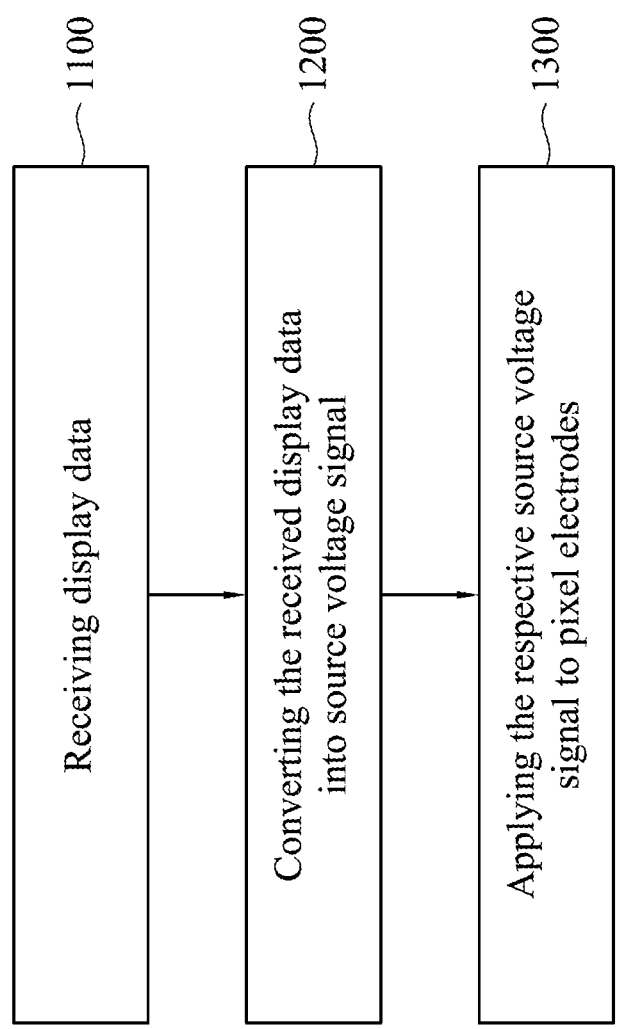
FIG. 3 a flow chart of a method for driving the display panel of the display module according to the embodiment of the present invention.

FIG. 2 illustrates a block diagram of the source driving module 146 of the display module 100 according to the embodiment of the present invention. FIG. 3 illustrates a flow chart of a method for driving the display panel 120 of the display module 100 according to the embodiment of the present invention. The source driving module 146 includes a data storage unit 152, a data converting unit 154, and a source driver 156. The data storage unit 152 is configured to receive the display data 160 in multiple frames, as shown in step 1100 of FIG. 3. The data storage unit 152 may be data latches that temporally store the display data 160. The data converting unit 154 is operatively coupled to the data storage unit 152. The data converting unit 154 may include DAC and any other logic component that convert the received display data 160 into the source voltage signals for each of the pixel electrodes, as shown in step 1200 of FIG. 3. The source driver 156 is operatively coupled to the data converting unit 154 and configured to apply the respective source voltage signals to each of the pixel electrodes, respectively, as shown in step 1300 of FIG. 3.

In generating the source voltage signals, the data converting unit 154 also controls the polarities of the source voltage signals, such as controlling the voltage polarity inversion frequency. Generally, the display panel refresh rate is normally at 60 Hz to prevent flickering caused by pixel voltage loss due to leakage current, the polarity of source voltage signals is switched at the same frequency as the frame rate.

FIG. 4 illustrates a scheme showing the polarities of source voltage signals for different driving frequency according to an exemplarily embodiment of the present invention. It is noted that the symbol "+" represents that the polarity of the source voltage signal is positive, and the symbol "−" represents that the polarity of the source voltage signal is negative. When the driving frequency is 60 Hz, corresponding to 1/60 seconds of each frame, and thus each pixel receives its next source voltage signal after 1/60 seconds. As shown in FIG. 4, when the driving frequency is 60 Hz, polarities of the source voltage signals in two consecutive frames are opposite to each other, thereby prevent flickering.

When there is need for low frequency driving, for example, the driving frequency is 40 Hz, as shown in FIG. 4, using three frames as one period, the first frame and the second frame of each of the periods are non-skipped frames applying the source voltage signal to each of the pixel electrodes, and the last frame of each of the periods is a skip frame without applying the source voltage signal to each of the pixel electrodes. It is noted that the symbol "x" represents the skip frame. For example, frame 2 (i.e., the last frame of the first period) is the skip frame, and frame 5 (i.e., the last frame of the second period) is the skip frame. Specifically, the TCON 142 controls the gate driving module 144 to skip a scan operation during the skip frame, and thus the respective source voltage signal is not applied to each of the pixel electrodes during the skip frame of each of the periods.

As shown in FIG. 4, when the driving frequency is 40 Hz, the polarities of source voltage signals are still switched, and thus polarities of the source voltage signal in two consecutive non-skipped frames are opposite to each other. However, in the case of 40 Hz driving frequency of FIG. 4, a flicker phenomenon occurs due to the positive-polarity source voltage and the negative-polarity source voltage being asymmetric with respect to the common voltage.

Figure 5:
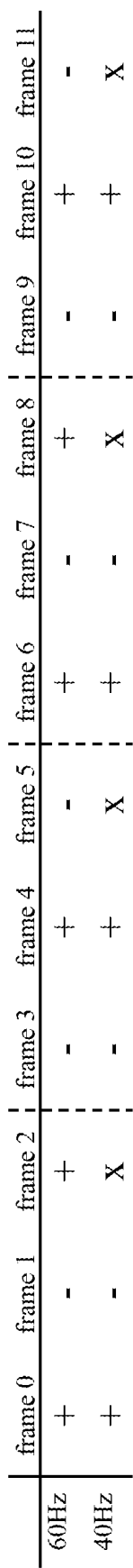
FIG. 5 illustrates a scheme showing the polarities of source voltage signals for different driving frequency according to the embodiment of the present invention.

The present invention discloses a method for preventing the flicker phenomenon when there are skip frames included in the display frames of the low frequency driving LCD. FIG. 5 illustrates a scheme showing the polarities of source voltage signals for different driving frequency according to the embodiment of the present invention. As shown in FIG. 5, when the driving frequency is 40 Hz, using three frames as one period, the first frame and the second frame of each of the periods are non-skipped frames applying the source voltage signal to each of the pixel electrodes, and the last frame of each of the periods is the skip frame without applying the source voltage signal to each of the pixel electrodes. The polarities of the source voltage signal in two consecutive non-skipped frames of each of the periods are opposite to each other. The polarity of the source voltage signal in the non-skipped frame directly preceding the skip frame of one period is opposite to the polarity of the source voltage signal in the non-skipped frame directly preceding the skip frame of subsequent period. For example, as shown in FIG. 5, the polarity of the source voltage signal in frame 1 (i.e., the non-skipped frame directly preceding the skip frame of the first period) is negative, and the polarity of the source voltage signal in frame 4 (i.e., the non-skipped frame directly preceding the skip frame of the second period) is positive. For another example, as shown in FIG. 4, the polarity of the source voltage signal in frame 4 (i.e., the non-skipped frame directly preceding the skip frame of the second period) is positive, and the polarity of the source voltage signal in frame 7 (i.e., the non-skipped frame directly preceding the skip frame of the third period) is negative.

In the case of 40 Hz driving frequency of FIG. 5, a flicker phenomenon is prevented due to the positive-polarity source voltage and the negative-polarity source voltage being symmetric with respect to the common voltage.

Therefore, the present invention discloses a method for preventing the flicker phenomenon when there are skip frames included in the display frames of the low frequency driving LCD.

From the above description, the present invention discloses a method and a source driving module for driving the display panel. The present invention controls the polarities of the source voltage signals applied to pixel electrodes of the display panel, thereby preventing the flicker phenomenon when there are skip frames included in the display frames of the low frequency driving LCD.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for driving a display panel having a plurality of pixel electrodes arranged in rows and columns, comprising:

receiving display data in a plurality of periods;

converting the received display data into a source voltage signal for each of the pixel electrodes; and applying the respective source voltage signal to each of the pixel electrodes;

wherein each of the periods comprises a plurality of frames consisting of a plurality of non-skipped frames and at least one skip frame subsequent to the non-skipped frames, where the skip frame is the frame without applying the source voltage signal to each of the pixel electrodes;

wherein a polarity of the source voltage signal in the non-skipped frame directly preceding the skip frame of one period is opposite to a polarity of the source voltage signal in the non-skipped frame directly preceding the skip frame of subsequent period.

2. The method of claim 1, wherein polarities of the source voltage signal applied to each of the pixel electrodes in two consecutive non-skipped frames of each of the periods are opposite to each other.

3. A source driving module for driving a display panel having a plurality of pixel electrodes arranged in rows and columns, comprising:

a data storage unit configured to receive display data in a plurality of periods;

a data converting unit operatively coupled to the data storage unit and configured to convert the received display data into a source voltage signal for each of the pixel electrodes; and a source driver operatively coupled to the data converting unit and configured to apply the respective source voltage signal to each of the pixel electrodes;

wherein each of the periods comprises a plurality of frames consisting of a plurality of non-skipped frames and at least one skip frame subsequent to the non-skipped frames, where the skip frame is the frame without applying the source voltage signal to each of the pixel electrodes;

wherein a polarity of the source voltage signal in the non-skipped frame directly preceding the skip frame of one period is opposite to a polarity of the source voltage signal in the non-skipped frame directly preceding the skip frame of subsequent period.

4. The source driving module of claim 3, wherein polarities of the source voltage signal applied to each of the pixel electrodes in two consecutive non-skipped frames of each of the periods are opposite to each other.

* * * * *